July 5, 1932.                E. L. CHOTT                1,866,294
MERCURY DISPENSER
Filed Nov. 13, 1929
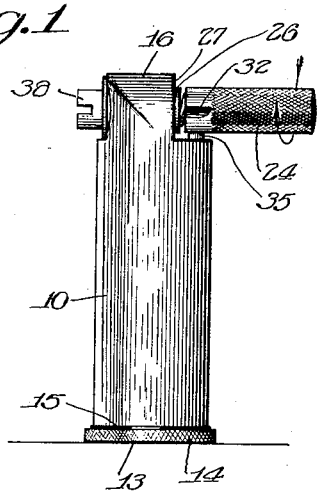
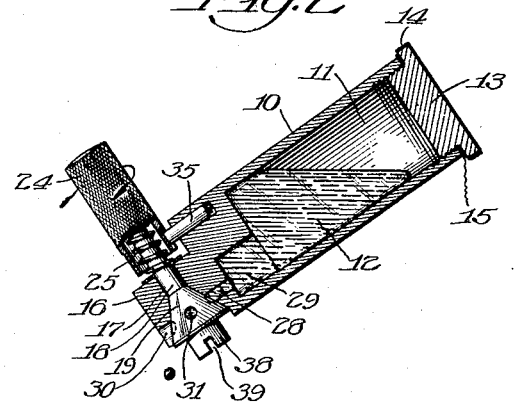
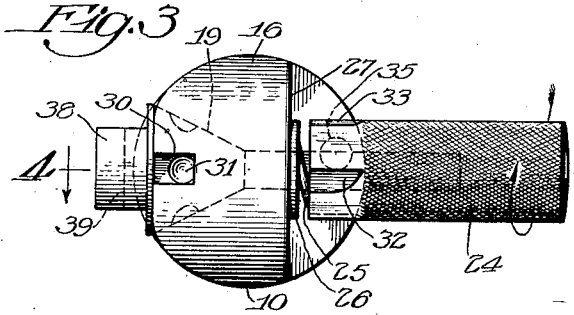
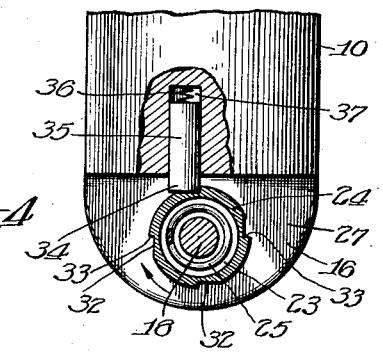
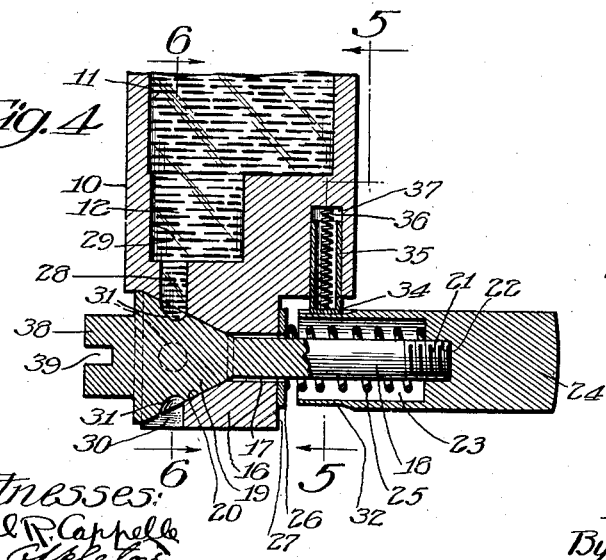
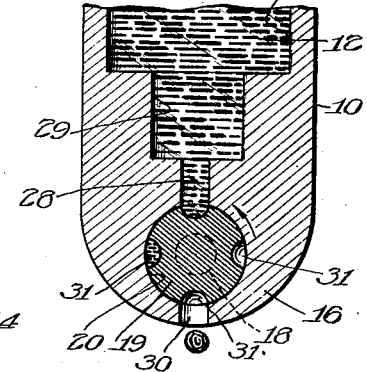
Witnesses:
Emil R. Cappelle
F. C. Appleton
Inventor:
Edward L. Chott
By Joshua R. H. Potts
his Attorney Patented July 5, 1932

1,866,294

UNITED STATES PATENT OFFICE

EDWARD L. CHOTT, OF CHICAGO, ILLINOIS

MERCURY DISPENSER

Application filed November 13, 1929. Serial No. 406,752.

This invention relates to measuring and dispensing devices, and more particularly to a mercury dispenser for use in connection with dentistry.

Dental amalgams as usually prepared comprise a triturated mixture of a characteristic metal alloy and mercury. To secure the proper resultant product it is essential that the ingredients be correctly proportioned and carefully mixed in a mortar. Owing to the peculiar characteristics of mercury, such as used in dental amalgams, it is difficult to measure with any degree of exactness the prescribed quantity by volume and weight which is necessary for the correct ratio in the mixture, which is an important factor in the results obtained in amalgam fillings.

The present invention has for its principal object to produce a simple device for measuring predetermined and definite quantities of flowable liquid substances, and more particularly mercury, for the purposes hereinbefore set forth. Another object of the invention is to provide a compact and handy device comprising a receptacle having a measuring valve for dispensing a predetermined quantity of the contents of the container. Other objects and advantages to be attained will hereinafter more fully appear.

The invention consists in the novel construction of the device and in the parts and combinations and arrangements of parts thereof as hereinafter described and pointed out with particularity in the appended claims.

In the accompanying drawing, forming a part of this specification and illustrating a practical adaptation of the invention,—

Fig. 1 is a side elevation of the device as set on end on a table or other support when not in use;

Fig. 2 is a longitudinal section through the container, the valve element being shown in elevation, and the device being illustrated in an operative position;

Fig. 3 is an elevation, on an enlarged scale, of the valve end portion of the device;

Fig. 4 is a fragmentary section, taken on or about the line 4—4 of Fig. 3;

Fig. 5 is a section on the line 5—5 of Fig. 4; and

Fig. 6 is a section on the line 6—6 of Fig. 4.

Referring now to the drawing, the numeral 10 designates the body portion of the device which, as shown, is cylindrical and provided with a chamber 11, said chamber being adapted to contain a liquid to be dispensed in measured quantities therefrom. The body of mercury or other liquid in the container 11, designated by the numeral 12, and illustrated in Figs. 2, 4 and 6 of the drawing, is placed in the chamber 11 through an opening at the end thereof, which is provided with a closure 13 in the form of a screw-threaded plug-like cap, said closure, as shown more clearly in Fig. 1, being provided with a knurled collar 14, and a gasket 15 being provided between said collar and the adjacent end of the chambered body portion 10 so as to make a leak-tight joint, as shown more clearly in Figs. 1 and 2 of the drawing.

At the opposite end of the chambered body portion 10 is a longitudinal extension or lug 16 which is provided with a transverse bore therethrough, a portion 17 of said bore being of a diameter to receive loosely therein the stem portion 18 of a valve element, which latter is provided with a conical head 19 fitted rotatably in a correspondingly flared enlargement 20 of said bore. The conical portion 19 of the valve element is fitted with exact nicety to the counterpart socket afforded by the flared enlargement 20 of the bore in said extension 16. In other words, said portion 19 is ground to its seat according to any approved method of fitting valves to their respective seats. The stem portion 18 of the valve element is screw-threaded at its outer end, as at 21, and secured in a counterpart screw-threaded axial socket 22 provided therefor at the bottom of a bore 23 formed in an externally knurled handle member 24. Coiled loosely about said stem portion 18 is a spring 25 which is interposed under compression between the bottom of the bore 23 in said handle member 24 and a washer 26 which is sleeved on the stem portion 18 and abuts a flattened face portion 27 of the end extension 16 of the body portion 10. This spring yieldably holds the conical portion 19 of the valve element in the counterpart seat 20 of the bore in said extension 16 and acts to automatically take up any wear which may occur in the seating faces of the valve portion 19 and socket 20.

The conical portion 19 of the valve element normally closes a longitudinal port or restricted passageway 28 which opens at its outer end into the flared portion 20 of the bore in the extension 16 and communicates at its inner end with a pocket 29, which latter is located to one side of the longitudinal axis of the body portion 10 and communicates with the chamber 11 therein. In longitudinal alinement with the port or restricted passageway 28 is a slotted opening 30 in the extension 16 which communicates with the flared socket portion 20 of the bore in which the conical portion 19 of the valve element is rotatably fitted, at a point diametrically opposite said port or passageway 28, said conical portion 19 of the valve element being provided with a plurality of recesses 31 which are respectively adapted to be brought successively into registering communication with the port or passageway 28 and said slotted opening 30 in succession when the valve element is rotated, and thereby deliver a measured quantity of the mercury or other liquid contained in the chamber 11. In order to provide for the rotation of the valve element and to limit its rotation to one direction, the inner end portion of the handle member 24 is provided with a series of circumferential recesses having flattened tangential faces 32 and radial shoulder portions 33, said flattened faces being arranged to receive the flattened end portion 34 of a spring-pressed bolt 35 whereby the handle member 24 is yieldably held against accidental rotation, and the adjacent shoulder portion 33 engaging the bolt 35 so as to prevent rotation of the handle member in one direction but permitting rotation thereof in the opposite direction when sufficient force is supplied to turn the handle member 24 and overcome the tension of a spring 36 which normally holds said bolt 35 yieldably in engagement with said handle member.

Preferably, as shown more clearly in Fig. 4 of the drawing, the bolt 35 is provided with a longitudinal bore for the accommodation of the spring 36 so as to minimize the depth of the bore 37 in which said bolt is slidably fitted in the end portion of the body member 10 and to permit the utilization of a spring of considerable length. As shown, there are four of the recesses 31 in the conical portion 19 of the valve element, and said recesses are disposed in diametrically opposed relation, and the circumferentially recessed portions of the handle member 24 which are engaged by the spring-pressed bolt 35 are correspondingly arranged, there being one of said bolt engaging portions correlated to each of the recesses 31 and being so arranged with respect to the bolt 35 that in the cooperative engaging relation of the bolt and circumferential seat portions of the handle element 24, there is always one of the recesses 31 in register with the port or passageway 28 and the diametrically opposite recess 31 is in communication with the slotted opening 30, from which opening 30 a measured quantity of the mercury or other liquid is discharged from the registering pocket 31. Obviously, the screw-threaded engagement between the stem 18 of the valve element and the axial recess 22 in the handle member 24 is such that the attachment tends to become tighter rather than loosened when the handle member is rotated in the proper direction to deliver the measured quantities of the contents from the container 10. However, should it become desirable to remove the valve element from the bore in the extension 16, it is only necessary to hold the handle member from rotating in its normal direction of rotation and unscrew the stem portion 18 of the valve element from the axial socket 22 of the handle member by turning said valve element in the direction of normal rotation of the handle member. For convenience in accomplishing this, the valve element may be provided with an end extension 38 having a transverse slot 39 for the reception of a screw driver blade or a special key device.

Obviously, the device may be made in various sizes according to the use for which it is intended. When the device is to be used particularly for measuring and dispensing mercury, as hereinbefore described, the container will be made to have a capacity of about a quarter-pound of mercury in the chamber 11, and the measuring and dispensing recesses 31 in the conical portion 19 of the valve element will be of the capacity of two, three, or five grain globules of mercury, which are the respective quantities that are used for the ordinary batches of amalgam to be prepared.

In use, the device may be conveniently held in one hand substantially at the angle illustrated in Fig. 2 of the drawing, and with the other hand the handle element or knob 24 may be conveniently grasped whereby to rotate the valve element and deliver the mercury drop by drop through the slotted outlet opening 30 at the lower corner of the extension 16. So, too, in some cases, the knob 24 may be manipulated with the thumb and fore finger of the same hand in which the device is held. In this connection, it may be here particularly noted that the peculiar ratchet arrangement between the knob 24 and valve element 19 is of considerable importance and materially advantageous in the operation of the device. That is to say, the resultant click as the spring-pressed bolt 35 snaps off the abrupt shouldered portion 33 onto the flattened face portion 32 of the handle element or knob 24, gives an audible indication to the operator that the valve element 19 has been rotated to the proper position to bring the recesses 31 into registration respectively with the port 28 and outlet 30. The action of the ratchet is of even greater advantage in that the spring-pressed bolt 35 moves suddenly off the abrupt shouldered portion 33 with snapping effect and strikes an appreciable blow upon the face portion 32, the shock of which insures the ejection of the globule of mercury through the opening 30 from the registered pocket 31 of the valve element 19.

Obviously, the device may be modified considerably in the various details and structural arrangements thereof without in the least departing from the spirit and scope of the invention as defined by the appended claims. The invention, therefore, is not limited to the specific construction and arrangement shown in the accompanying drawing.

Having thus described my invention, what I claim as new and desire to secure by Letters Patent is:

1. A dispensing device of the character described, comprising a cylindrical body member having a longitudinal liquid containing chamber therein, said body member having a longitudinal end extension provided with a restricted longitudinal passageway at one side of the axis of said body member, communicating at its inner end with the liquid containing chamber in said body member and at its outer end with a discharge outlet at the corner of said end extension of the body member, a transverse bore in said end extension of the body member intercepting communicably said longitudinal passageway and outlet opening, a valve member rotatable in said transverse bore and having circumferential recesses adapted to intermittently register with said restricted longitudinal passageway and said outlet opening whereby to deliver measured quantities of the contents from the liquid containing chamber in said body member, a laterally projecting handle member for rotating said valve element, and ratchet means for restricting rotation of said handle member to one direction only, said racket means including a spring-pressed stud cooperating with a shouldered flattened face on said handle member whereby to snap into yieldable retentive engagement therewith and by such action to impart vibratory shock to the device.

2. A dispensing device of the character described, comprising a cylindrical body member having a longitudinal bore therein constituting a liquid containing chamber, said body member having a longitudinal end extension provided with a restricted longitudinal passageway communicating with said liquid containing chamber at one side of the axis of said body member, said body extension having an outlet opening at the corner thereof in correlation to said restricted passageway, said body extension having a transverse bore with an outwardly flared enlargement at its end between said restricted passageway and outlet opening, a valve element rotatable in said transverse bore and having a counterpart tapered portion fitted rotatably in the flared enlargement of said bore and an axial stem extending from the smaller end of said tapered portion, said tapered portion of the valve element having an annular series of circumferential recesses for communication intermittently with said restricted passageway and with said outlet opening in succession, a handle member detachably secured to the end portion of the stem of said valve element, said handle member having an axial bore of larger diameter in which said valve stem is received, a spring sleeved about said stem and acting against the bottom of the bore and the body extension whereby said valve element is held with its tapered portion seated rotatably in the flared enlargement of said transverse bore, and ratchet means restricting rotation of said handle member to one direction only whereby said valve element is correspondingly rotated.

3. In a device of the character described, as set forth in claim 2, the said ratchet means thereof including an element rotatable with the valve element and having a series of stop faces, each of which has a correlated abrupt shoulder, and a spring-pressed element cooperating with said rotatable ratchet element whereby to intermittently ride from the shouldered portions and thereby impact upon the respective stop faces of said rotatable element.

4. A dispensing device of the character described, comprising a longitudinally chambered body portion having a restricted outlet opening at the lower corner of one end thereof, and an outwardly contracted passageway for communication between the chamber thereof and said outlet opening, a rotatable valve element interposed between said outlet opening and said passageway, said valve element operating about an axis transversely of the adjacent end portion of the body of the device and having a circumferentially recessed portion adapted to intermittently cooperate with said outlet opening and said passageway whereby to receive from said passageway a measured quantity of the contents from said chamber and deliver the same to said outlet opening, and ratchet means comprising a stepped wheel and a cooperating spring-pressed plunger whereby said valve element is rotatable in one direction only and vibration is imparted to the device by the snap action of said ratchet at the termination of each step in the operating movement of said valve.

In testimony whereof I have signed my name to this specification.

EDWARD L. CHOTT.